(12) United States Patent
Hutt et al.

(10) Patent No.: US 7,035,425 B2
(45) Date of Patent: Apr. 25, 2006

(54) FREQUENCY RESPONSE ENHANCEMENTS FOR ELECTRO-DYNAMIC LOUDSPEAKERS

(75) Inventors: Steven W. Hutt, Bloomington, IN (US); David B. Garner, Indianapolis, IN (US); John F. Steere, Martinsville, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 501 days.

(21) Appl. No.: 10/429,243

(22) Filed: May 2, 2003

(65) Prior Publication Data

US 2004/0008863 A1   Jan. 15, 2004

Related U.S. Application Data (60) Provisional application No. 60/391,134, filed on Jun. 24, 2002, provisional application No. 60/378,188, filed on May 6, 2002, provisional application No. 60/380,001, filed on May 2, 2002.

(51) Int. Cl.
*H04R 25/00* (2006.01)

(52) U.S. Cl. .................................. 381/431; 381/421

(58) Field of Classification Search ............... 381/189, 381/347, 348, 396, 398, 399, 408, 421, 423, 381/431

See application file for complete search history.

(56) References Cited

U.S. PATENT DOCUMENTS

| | | | |
|---|---|---|---|
| 1,643,791 A | 9/1927 | Slepian | |
| 3,141,071 A | 7/1964 | Rich | |
| 3,164,686 A | 1/1965 | Tibbetts | |
| 3,570,626 A | 3/1971 | Mochida et al. | |
| 3,654,403 A | 4/1972 | Bobb | |
| 3,674,946 A | 7/1972 | Winey | |
| 3,919,499 A | 11/1975 | Winey | |
| 4,037,061 A | 7/1977 | von Recklinghausen | |
| 4,210,786 A | 7/1980 | Winey | |
| 4,264,789 A | 4/1981 | Kaizu et al. | |
| 4,281,223 A | 7/1981 | Ugaji et al. | |
| 4,316,062 A | 2/1982 | Beveridge | |
| 4,384,173 A | 5/1983 | Briefer et al. | |
| 4,468,530 A | 8/1984 | Torgeson | |
| 4,471,172 A | 9/1984 | Winey | |
| 4,471,173 A | 9/1984 | Winey | |
| 4,480,155 A | 10/1984 | Winey | |
| 4,484,037 A | 11/1984 | Nieuwendijk et al. | |
| 4,536,623 A | 8/1985 | Larson | |
| 4,544,805 A | 10/1985 | Sawafuji et al. | |
| 4,584,439 A | 4/1986 | Paddock | |

(Continued)

FOREIGN PATENT DOCUMENTS

FR        2 765 767        1/1999

OTHER PUBLICATIONS

"Dynamic Amplitude Shading of Electronically Steered Line Source Arrays," an Audio Engineering Society Preprint 3272; Richard Schmidmaier, Munchen, Germany; David G. Meyer, School of Electrical Engineering, Purdue University, West Lafayette, Indiana.

(Continued)

*Primary Examiner*—Sinh Tran
*Assistant Examiner*—Brian Ensey
(74) *Attorney, Agent, or Firm*—Pauley Petersen & Erickson (57) ABSTRACT

In an electro-dynamic loudspeaker, vent holes are optimized to provide improved the magnetic flux characteristics while maintaining sufficient ventilation. In addition, ported and unported enclosures may be utilized with the electro-dynamic loudspeakers to enhance low frequency performance.

10 Claims, 5 Drawing Sheets

U.S. PATENT DOCUMENTS

| | | |
|---|---|---|
| 4,653,103 A | 3/1987 | Mori et al. |
| 4,703,510 A | 10/1987 | Larson |
| 4,723,296 A | 2/1988 | Nieuwendijk et al. |
| 4,750,257 A | 6/1988 | Larson |
| 4,803,733 A | 2/1989 | Carver et al. |
| 4,837,838 A | 6/1989 | Thigpen et al. |
| 4,924,504 A | 5/1990 | Burton |
| 4,939,784 A | 7/1990 | Bruney |
| 5,021,613 A | 6/1991 | Garcia .................. 381/399 |
| 5,148,493 A | 9/1992 | Bruney |
| 5,195,143 A | 3/1993 | Spiegel |
| 5,283,836 A | 2/1994 | Trufitt |
| 5,297,214 A | 3/1994 | Bruney |
| 5,430,805 A | 7/1995 | Stevenson et al. .......... 381/408 |
| 5,627,903 A | 5/1997 | Porrazzo et al. |
| 5,764,595 A | 6/1998 | Power |
| 5,850,461 A | 12/1998 | Zelinka .................. 381/398 |
| 5,901,235 A | 5/1999 | Thigpen et al. .......... 381/431 |
| 5,905,805 A | 5/1999 | Hansen |
| 5,953,438 A | 9/1999 | Stevenson et al. .......... 381/431 |
| 5,961,762 A | 10/1999 | Zelinka et al. .......... 156/164 |
| 6,008,714 A | 12/1999 | Okuda et al. .......... 336/200 |
| 6,097,830 A | 8/2000 | Zelinka et al. .......... 381/431 |
| 6,104,825 A | 8/2000 | Thigpen .................. 381/408 |
| 6,154,557 A | 11/2000 | Montour et al. |
| 6,185,310 B1 | 2/2001 | Kermani et al. .......... 381/431 |
| 6,546,106 B1 | 4/2003 | Azima |
| 6,593,847 B1 | 7/2003 | Miyazaki et al. .......... 340/388.1 |
| 6,845,166 B1 | 1/2005 | Hara et al. |
| 2001/0005419 A1 | 6/2001 | Kermani et al. .......... 381/189 |
| 2001/0009586 A1 | 7/2001 | Suzuki |
| 2001/0048256 A1 | 12/2001 | Miyazaki et al. |
| 2002/0191808 A1 | 12/2002 | Croft III, et al. .......... 381/431 |

OTHER PUBLICATIONS

"Line Arrays: Theory and Applications," Audio Engineering Society, Convention Paper 5304; Mark S. Ureda, JBL Professional, Northridge, CA; presented at the 110th Convention May 12-15, 2001, Amsterdam, The Netherlands.

EDM Charmilles; A Practical Guide to Electro-Discharge Machining; Atellers des Charmilles S.A. (p. 12-13).

Furihata et al., "Acoustic characteristics of an electrodynamic planar digital loudspeaker." J. Acoustical Society of America 114(1):174-184, Jul. 2003.

"Analysis of Loudspeaker Line Arrays" by Mark S. Ureda, J. Audio Eng. Soc., vol. 52 No. 5 . . . May 2004.

FREQUENCY RESPONSE ENHANCEMENTS FOR ELECTRO-DYNAMIC LOUDSPEAKERS

CROSS REFERENCE TO RELATED APPLICATIONS

This application claims the benefit of U.S. Provisional Application Nos. 60/380,001, filed May 2, 2002, 60/378,188, filed May 6, 2002, and 60/391,134, filed Jun. 24, 2002. These patent applications are incorporated reference.

CROSS REFERENCE TO CO-PENDING APPLICATIONS

This application incorporates by reference the disclosures of each of the following co-pending applications which have been filed concurrently with this application: U.S. patent application Ser. No. 10/428313, entitled "Mounting Bracket System," filed May 2, 2003; U.S. patent application Ser. No. 10/429165, entitled "Film Tensioning System," filed May 2, 2003; U.S. patent application Ser. No. 10/428316, entitled "Film Attaching System," filed May 2, 2003; U.S. patent application Ser. No. 10/429228, entitled "Electrical Connectors For Electro-Dynamic Loudspeakers," filed May 2, 2003; U.S. patent application Ser. No. 10/428314, entitled "Electro-Dynamic Loudspeaker Mounting System," filed May 2, 2003; U.S. patent application Ser. No. 10/429173, entitled "Conductors For Electro-Dynamic Loudspeakers," filed May 2, 2003; U.S. patent application Ser. No. 10/429164, entitled "Frame Structure," filed May 2, 2003; U.S. patent application Ser. No. 11/039494, "Acoustically Enhanced Electro-Dynamic Loudspeakers," filed May 2, 2003; U.S. patent application Ser. No. 10/429162, entitled "Directivity Control Of Electro-Dynamic Loudspeakers," filed May 2, 2003; and U.S. patent application Ser. No. 10/429163, entitled "Magnet Arrangement For Loudspeaker," filed May 2, 2003.

BACKGROUND OF THE INVENTION

1. Field of Invention

The invention relates to electro-dynamic loudspeakers, and more particularly, to frequency response enhancements for electro-dynamic loudspeakers.

2. Related Art

The general construction of an electro-dynamic loudspeaker includes a diaphragm, in the form of a thin film, attached in tension to a frame. An electrical circuit, in the form of electrically conductive traces, is applied to the surface of the diaphragm. Magnetic sources, typically in the form of permanent magnets, are mounted adjacent to the diaphragm or within the frame, creating a magnetic field. When current is flowing in the electrical circuit, the diaphragm vibrates in response to the interaction between the current and the magnetic field. The vibration of the diaphragm produces the sound generated by the electro-dynamic loudspeaker.

Many design and manufacturing challenges present themselves in the manufacturing of electro-dynamic loudspeakers. First, the diaphragm, that is formed by a thin film, needs to be permanently attached, in tension, to the frame. Correct tension is required to optimize the resonance frequency of the diaphragm. Optimizing diaphragm resonance extends the bandwidth and reduces sound distortion of the loudspeaker.

The diaphragm is driven by the motive force created when current passes through the conductor applied to the diaphragm within the magnetic field. The conductor on the electro-dynamic loudspeaker is attached directly to the diaphragm. Because the conductor is placed directly onto the thin diaphragm, the conductor should be constructed of a material having a low mass and should also be securely attached to the film at high power (large current) and high temperatures.

Accordingly, designing conductors for electro-dynamic loudspeaker applications presents various challenges such as selecting the speaker with the desired audible output for a given location that will fit within the size and location constraints of the desired applications environment. Electro-dynamic loudspeakers exhibit a defined acoustical directivity pattern relative to each speaker's physical shape and the frequency of the audible output produced by each loudspeaker. Consequently, when an audio system is designed, loudspeakers possessing a desired directivity pattern over a given frequency range are selected to achieve the intended performance of the system. Different loudspeaker directivity patterns may be desirable for various loudspeaker applications. For example, for use in a consumer audio system for a home listening environment, a wide directivity may be preferred. In the application of a loudspeaker, a narrow directivity may be desirable to direct sound, e.g., voice, in a predetermined direction.

Often, space limitations in the listening environment prohibit the use of a loudspeaker in an audio system that possesses the preferred directivity pattern for the system's design. For example, the amount of space and the particular locations available in a listening environment for locating and/or mounting the loudspeakers of the audio system may prohibit the use of a particular loudspeaker that exhibits the intended directivity pattern. Also, due to space and location constraints, it may not be possible to position or oriented the desired loudspeaker in a manner consistent with the loudspeaker's directivity pattern. Consequently, size and space constraints of a particular environment may make it difficult to achieve the desired performance from the audio system. An example of a listening environment having such constraints is the interior passenger compartment of an automobile or other vehicle.

While the electric circuitry of electro-dynamic loudspeakers may present design challenges, electro-dynamic loudspeakers are very desirable loudspeakers because they are designed to have a very shallow depth. With this dimensional flexibility, electro-dynamic loudspeakers may be positioned at locations where conventional loudspeakers would not traditionally fit. This dimensional flexibility is particularly advantageous in automotive applications where positioning a loudspeaker at a location that a conventional loudspeaker would not otherwise fit could offer various advantages. Further, because the final loudspeaker assembly may be mounted on a vehicle, it is important that the assembly be rigid during shipping and handling so that the diaphragm or frame does not deform during installation.

While conventional electro-dynamic loudspeakers are shallow in depth and may therefore be preferred over conventional loudspeakers for use in environments requiring thin loudspeakers, electro-dynamic loudspeakers have a generally rectangular planar radiator that is generally relatively large in height and width to achieve acceptable operating wavelength sensitivity, power handling, maximum sound pressure level capability and low-frequency bandwidth. Unfortunately, the large rectangular size results in a high-frequency beam width angle or coverage that may be too narrow for its intended application. The high-frequency horizontal and vertical coverage of a rectangular planar radiator is directly related to its width and height in an inverse relationship. As such, large radiator dimensions exhibit narrow high-frequency coverage and vice versa.

The frame of the electro-dynamic loudspeakers supports the magnets, the diaphragm, and the terminal. A ferrous steel frame that carries magnetic flux may improve efficiency over a non-ferrous frame. The frame presents design challenges because it should be rigid enough to keep the diaphragm film tension uniform and capable of not deforming during handling, assembly, or over time. The frame also should be capable of withstanding environmental high temperatures, humidity, salt, spray, etc., and should be capable of bonding with the diaphragm film.

The undriven portions of the diaphragm film may be dampened to help reduce distortion and smooth frequency response. Damping controls film edges by reducing unproductive vibration.

Furthermore, the control directivity of sound is important for a good system design and acoustical interaction in the listening environment. The electro-dynamic loudspeakers exhibit defined acoustical directivity relative to frequency, to shape, and also to distance from the source. In addition, other frequency response enhancements can also be made to the current electro-dynamic loudspeaker designs.

The dimensional flexibility obtained with an electro-dynamic loudspeaker permits various locations in automotive and non-automotive vehicles to house electro-dynamic loudspeakers. Different locations offer various advantages over other locations. The thin depth of the electro-dynamic loudspeaker allows it to fit where conventional loudspeakers would not. As the final assembly may be mounted on a vehicle, it should be rigid during shipping and handling and should not allow the diaphragm or frame to deform during installation.

SUMMARY

The invention provides frequency response enhancements for electro-dynamic loudspeakers including optimizing vent hole sizes provided in the frame for balancing the magnetic flux versus acoustic performance. Specifically, an electro-dynamic loudspeaker includes a frame having a recess portion and a plurality of vent holes in the recessed portion. The vent holes are arranged in a plurality of columns with the vent holes in each column being separated by a plurality of webs, where a combined length of the vent holes in a longitudinal length of the columns and a combined length of the webs in a longitudinal length of the columns define a total length of the columns of vent holes. The combined length of the webs in a longitudinal length of the columns should be greater than 20 percent of the total length of the columns of vent holes. The vent holes allow air disposed between the diaphragm and frame of the electro-dynamic loudspeaker to enter and exit the electro-dynamic loudspeaker as the diaphragm vibrates. Some resistance to the airflow is provided by a layer of dampening material such as felt that resists the flow of air through it. A magnetic flux is provided between the adjacent columns of magnets where the webs disposed between the vent holes enhance the magnetic flux between the columns of magnets. The vent holes are also maintained of sufficient size to allow proper venting of the electro-dynamic loudspeaker.

The electro-dynamic loudspeaker may be mounted to an enclosure defining an enclosed space behind the frame of the electro-dynamic loudspeaker. The enclosure can be provided with or without ports and optimizes low frequency performance for the electro-dynamic loudspeaker.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views

DETAILED DESCRIPTION

Figure 1:
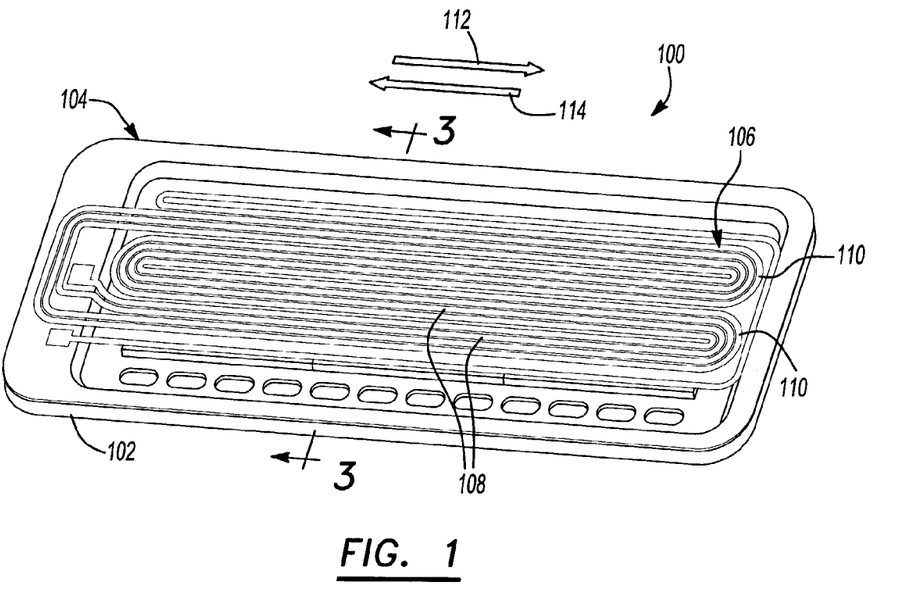
FIG. 1 is a perspective view of an example electro-dynamic loudspeaker.

FIG. 1 is a perspective view of an electro-dynamic loudspeaker 100 of the invention. As shown in FIG. 1, the electro-dynamic loudspeaker is a generally planar loudspeaker having a frame 102 with a diaphragm 104 attached in tension to the frame 102. A conductor 106 is positioned on the diaphragm 104. The conductor 106 is shaped in serpentine fashion having a plurality of substantially linear sections (or traces) 108 longitudinally extending along the diaphragm interconnected by radii 110 to form a single current path. Permanent magnets 202 (shown in FIG. 2) are positioned on the frame 102 underneath the diaphragm 104, creating a magnetic field.

Linear sections 108 are positioned within the flux fields generated by permanent magnets 202. The linear sections 108 carry current in a first direction 112 and are positioned within magnetic flux fields having similar directional polarization. Linear sections 108 of conductor 106 having current flowing in a second direction 114, that is opposite the first direction 112, are placed within magnetic flux fields having an opposite directional polarization. Positioning the linear sections 108 in this manner assures that a driving force is generated by the interaction between the magnetic fields developed by magnets 202 and the magnetic fields developed by current flowing in conductor 106. As such, an electrical input signal traveling through the conductor 106 causes the diaphragm 104 to move, thereby producing an acoustical output.

Figure 2:
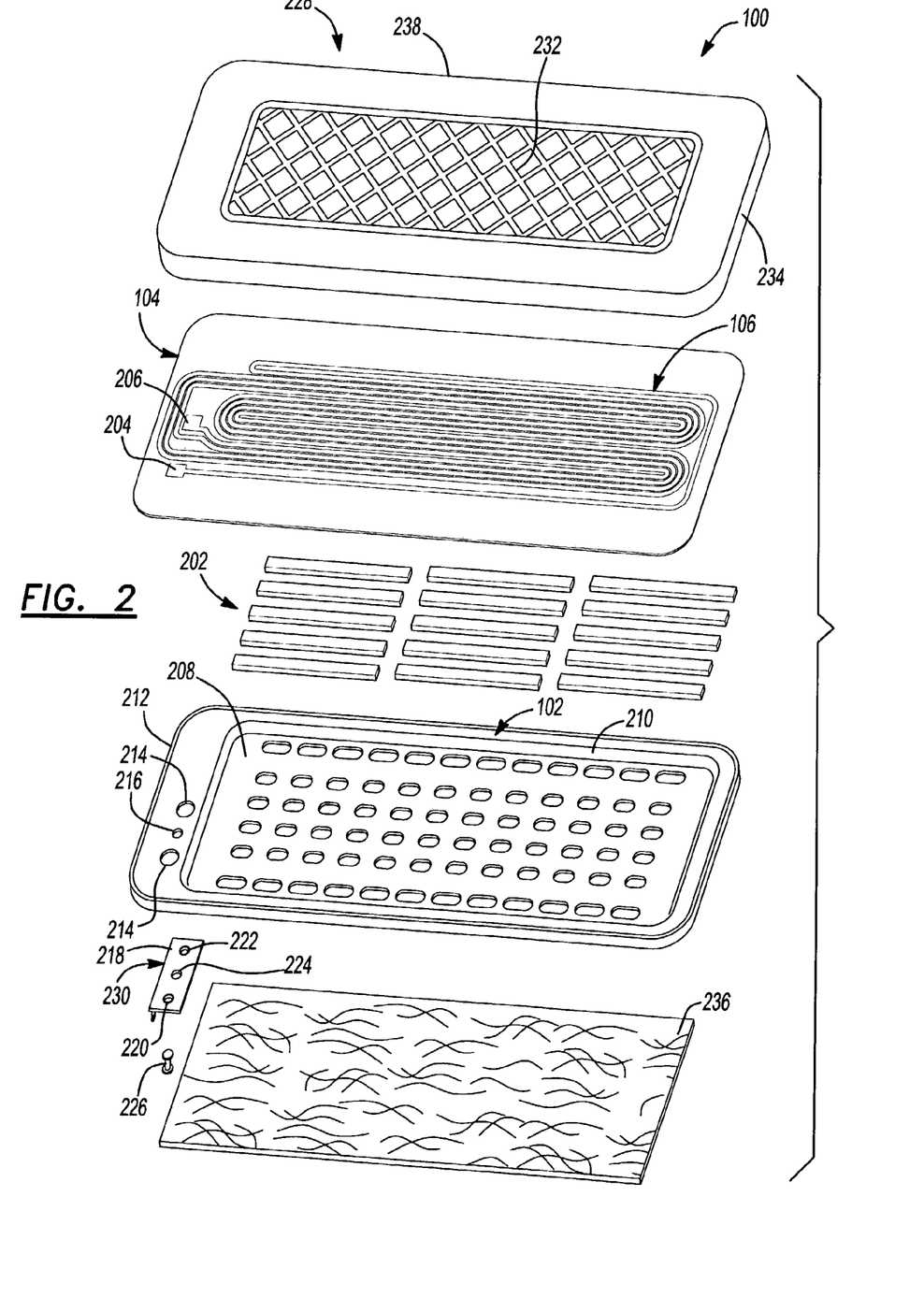
FIG. 2 is an exploded perspective view of the electro-dynamic loudspeaker shown in FIG. 1.

FIG. 2 is an exploded perspective view of the electro-dynamic loudspeaker 100 shown in FIG. 1. As illustrated in FIG. 2, the flat panel loudspeaker 100 includes a frame 102, a plurality of high energy magnets 202, a diaphragm 104, an acoustical dampener 236 and a grille 228. Frame 102 provides a structure for fixing magnets 202 in a predetermined relationship to one another. In the depicted embodiment, magnets 202 are positioned to define five rows of magnets 202 with three magnets 202 in each row. The rows are arranged with alternating polarity such that fields of magnetic flux are created between each row. Once the flux fields have been defined, diaphragm 104 is fixed to frame 102 along its periphery.

A conductor 106 is coupled to the diaphragm 104. The conductor 106 is generally formed as an aluminum foil bonded to the diaphragm 104. The conductor 106 can, however, be formed from other conductive materials. The conductor 106 has a first end 204 and a second end 206 positioned adjacent to one another at one end of the diaphragm 104.

As shown in FIG. 2, frame 102 is a generally dish-shaped member preferably constructed from a substantially planar contiguous steel sheet. The frame 102 includes a base plate 208 surrounded by a wall 210. The wall 210 terminates at a radially extending flange 212. The frame 102 further includes apertures 214 and 216 extending through flange 212 to provide clearance and mounting provisions for a conductor assembly 230.

Conductor assembly 230 includes a terminal board 218, a first terminal 220 and a second terminal 222. Terminal board 218 includes a mounting aperture 224 and is preferably constructed from an electrically insulating material such as plastic, fiberglass or other insulating material. A pair of rivets or other connectors (not shown) pass through apertures 214 to electrically couple first terminal 220 to first end 204 and second terminal 222 to second end 206 of conductor 106. A fastener such as a rivet 226 extends through apertures 224 and 216 to couple conductor assembly 230 to frame 102.

A grille 228 functions to protect diaphragm 104 from contact with objects inside the listening environment while also providing a method for mounting loudspeaker 100. The grille 228 has a substantially planar body 238 having a plurality of apertures 232 extending through the central portion of the planar body 238. A rim 234 extends downward, substantially orthogonally from body 238, along its perimeter and is designed to engage the frame 102 to couple the grille 228 to the frame 102.

An acoustical dampener 236 is mounted on the underside of the base plate 208 of the frame 102. Dampener 236 serves to dissipate acoustical energy generated by diaphragm 104 thereby minimizing undesirable amplitude peaks during operation. The dampener 236 may be made of felt, or a similar gas permeable material.

Figure 3:
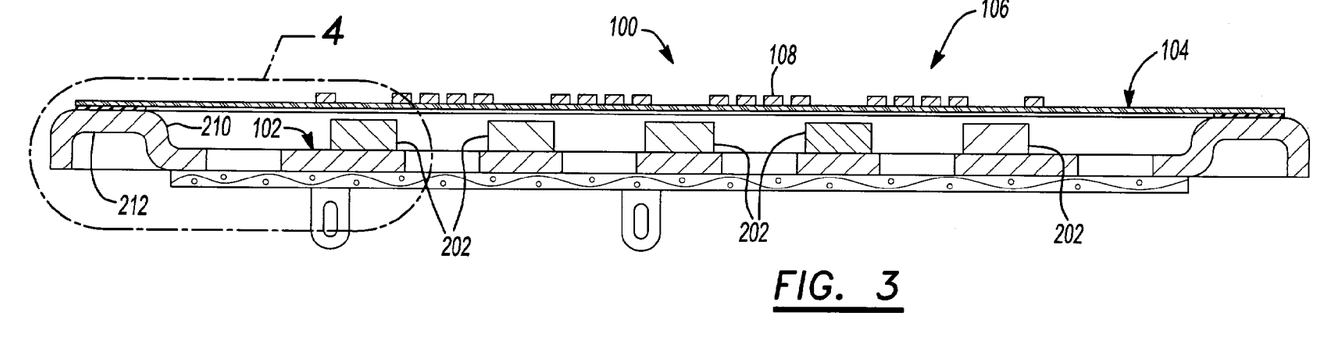
FIG. 3 is a cross-sectional view of the electro-dynamic loudspeaker taken along line 3—3 of FIG. 1.

FIG. 3 is a cross-sectional view of the electro-dynamic loudspeaker taken along line 3—3 of FIG. 1. FIG. 3 shows the frame 102 having the diaphragm 104 attached in tension to the frame 102 and the permanent magnets 202 positioned on the frame 102 underneath the diaphragm 104. Linear sections 108 of the conductor 106 are also shown positioned on top of the diaphragm 104.

Figure 4:
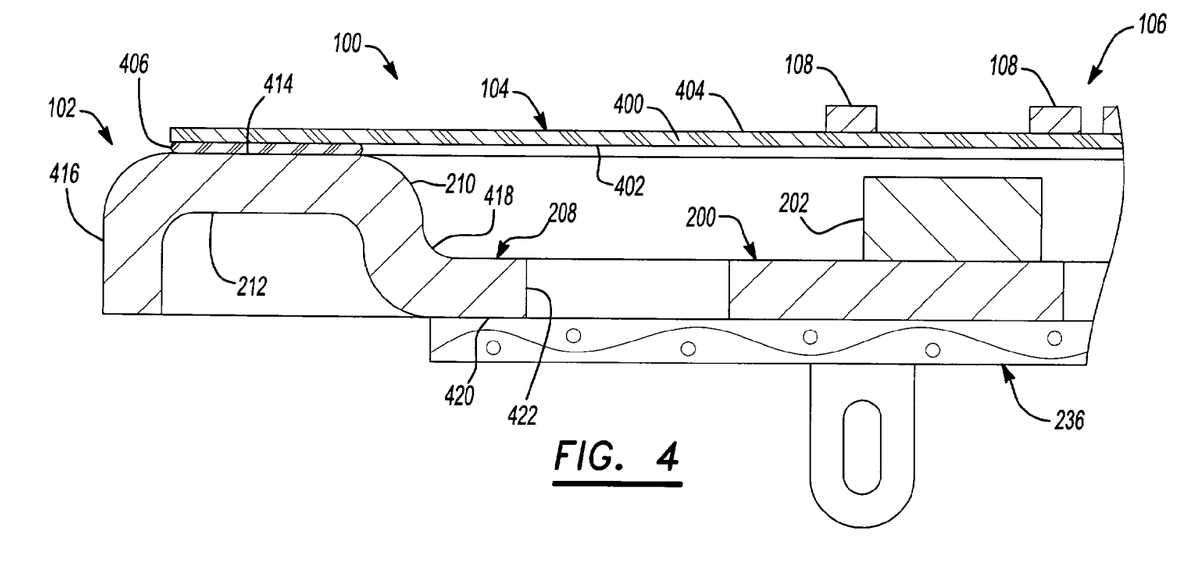
FIG. 4 is an enlarged cross-sectional view of the encircled area of FIG. 3.
Figure 5:
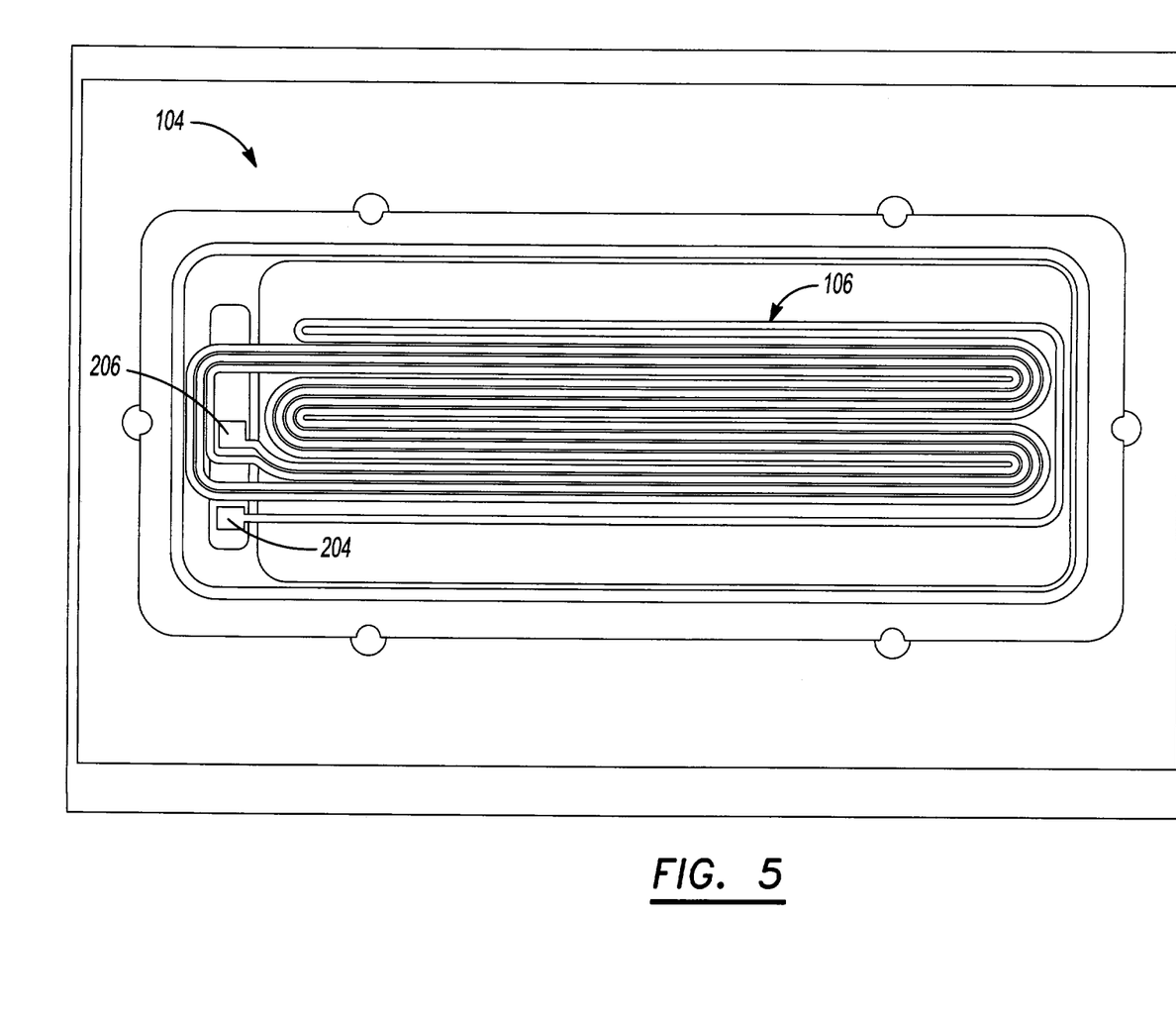
FIG. 5 is a plan view of an example conductor attached to the film.

FIG. 4 is an enlarged cross-sectional view of the encircled area of FIG. 3. As illustrated by FIG. 4, the diaphragm 104 is comprised of a thin film 400 having a first side 402 and a second side 404. First side 402 is coupled to frame 102. Generally, the diaphragm 104 is secured to the frame 102 by an adhesive 406 that is curable by exposure to radiation. However, the diaphragm 104 may secured to the frame 102 by other mechanism, such as those known in the art.

To provide a movable membrane capable of producing sound, the diaphragm 104 is mounted to the frame 102 in a state of tension and spaced apart a predetermined distance from magnets 202. The magnitude of tension of the diaphragm 104 depends on the speaker's physical dimensions, materials used to construct the diaphragm 104 and the strength of the magnetic field generated by magnets 202. Magnets 202 are generally constructed from a highly energizable material such as neodymium iron boron (NdFeB), but may be made of other magnetic materials. The thin diaphragm film 400 is generally a polyethylenenaphthalate sheet having a thickness of approximately 0.001 inches; however, the diaphragm film 400 may be formed from materials such as polyester (e.g., known by the tradename "Mylar"), polyamide (e.g., known by the tradename "Kapton") and polycarbonate (e.g., known by the tradename "Lexan"), and other materials known by those skilled in the art for forming diaphragms 104.

The conductor 106 is coupled to the second side 404 of the diaphragm film 400. The conductor 106 is generally formed as an aluminum foil bonded to diaphragm film 400, but may be formed of other conductive material known by those skilled in the art.

The frame 102 includes a base plate 208 surrounded by a wall 210 extending generally orthogonally upward from the plate 208. The wall 210 terminates at a radially extending flange 212 that defines a substantially planar mounting surface 414. A lip 416 extends downwardly from flange 212 in a direction substantially parallel to wall 210. Base plate 208 includes a first surface 418, a second surface 420 and a plurality of apertures 422 extending through the base plate 208. The apertures 422 are positioned and sized to provide air passageways between the first side 402 of diaphragm 104 and first surface 418 of frame 102. An acoustical dampener 236 is mounted to second surface 420 of frame base plate 208.

Figure 6:
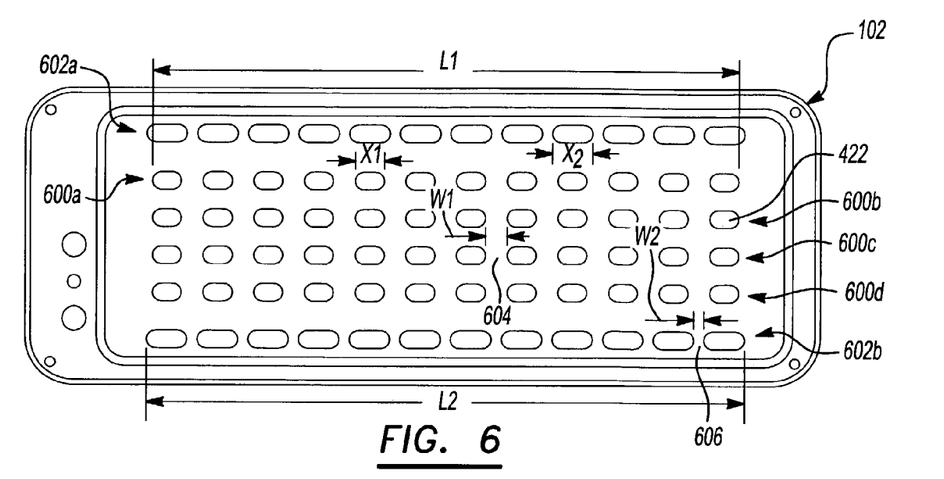
FIG. 6 is a plan view of an example frame for an electro-dynamic loudspeaker.

FIG. 6 provides a plan view of frame 102. The frame 102 includes a plurality of apertures or vent holes 422 which are arranged in columns which are aligned between the magnets 202. The columns include interior columns of vent holes 600a, 600b, 600c, 600d and a pair of outer edge columns 602a, 602b. The inner columns 600a, 600b, 600c, 600d each have a length L1, and the outer columns 602a, 602b of vent holes have a length L2. Each of the vent holes 422 of the inner columns 600a, 600b, 600c, 600d are separated by a web portion 604 having a web length W1. The outer columns of vent holes 602a, 602b are each separated by a web portion 606 having a width W2. Each of the vent holes 422 of the inner vent hole columns 600a, 600b, 600c, 600d has a length X1 while the vent holes of the outer columns 602a, 602b have a length X2. The vent holes 422 are provided in order to allow air disposed between the diaphragm 104 and the frame 102 to escape the recessed portion of the frame 102 as the diaphragm 104 vibrates. A layer of felt material 236 may be disposed on the back surface of the frame 102 to provide a dampening function by slightly inhibiting air travel through the vent holes 422. The web portions 604 and 606 provided between the vent holes 422 provide enhanced flux lines to be formed between the magnets 202 of the different columns.

An optimal web 604 size for balancing the flux density with the air flow resistance may be determined based on the amount of metal in the web areas and the size of the holes 422. The webs 604 having a width W and the vent holes 422 having a width X1 combine to form a column of total longitudinal length L1. The length of the webs in the column may be optimized such that the combined web lengths W in the length L1 of one of the columns 600a, 600b, 600c, 600d should be greater than about 20 percent and should be less than about 45 percent of the total length L1. In one example shown, the length L1 of a column 600a, 600b, 600c, or 600d is approximately 147 millimeters while the width X1 of the vent holes 422 is 7.25 millimeters and the web length W1 is 5.45 millimeters. Thus, the combined lengths of the webs W1 is approximately 60 millimeters (11 * 5.45 mm) yielding a combined web length of approximately 41 percent of the total column length L1. The webs have an approximate thickness of about 1.2 millimeters. The increased web distance provides around a six percent increase in the magnetic flux due to the increased magnetic path and therefore lower energy magnets may be utilized. The outer columns 602a, 602b with vent holes 422 have narrower webs 606 provided between the vent holes 422. The web of one of the outer columns 602a, 602b makes up less than 20 percent of the total length of the outer columns 602a or 602b. Because the webs 606 are not provided between columns of magnets, the narrow webs have no impact on the flux lines and therefore, can be maintained with a narrower length. In one example, the total length L2 of the outer columns 602a and 602b is approximately 150 millimeters with the vent holes 422 having a length X2 equal to approximately 10.25 millimeters and the web 606 length W2 between each of the vent holes 422 is approximately 2.45 millimeters. Accordingly, the total distance of the webs 606 (2.45 mm * 11=26.95 mm) provided between the vent holes of the outer columns 602a and 602b is approximately 18 percent (26.95/150=18%) of the total length L2 of one of the outer columns. Similar effects may be obtained by using thicker steel in the frame but are more costly, heavier, and more difficult to form.

Figure 7:
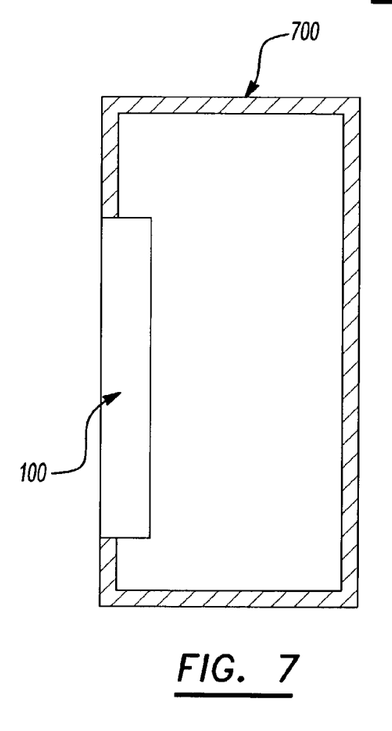
FIG. 7 is a schematic cross-sectional view of an example electro-dynamic loudspeaker mounted in an enclosure.

In FIG. 7, the electro-dynamic loudspeaker 100 according to the invention is mounted to an enclosure 700 that is un ported. The enclosure 700 optimizes the low frequency performance of the electro-dynamic loudspeaker 100. The materials, size, and shape of the enclosure are each application specific.

Figure 8:
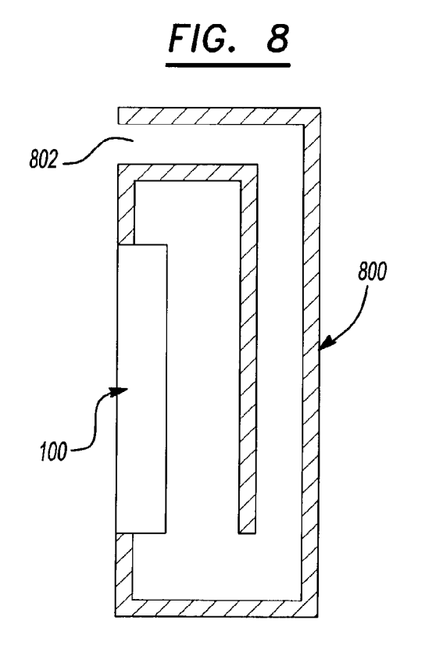
FIG. 8 is a schematic cross-sectional view of an example electro-dynamic loudspeaker mounted to a ported enclosure.

With reference to FIG. 8, the electro-dynamic loudspeaker 100 is provided with a ported enclosure 800 including a port 802. The port 802 provides a means for the rear output of the electro-dynamic loudspeaker to contribute to the total output of the system. However, the enclosure 800 only contributes over a very narrow range of frequencies. In fact, the enclosure 800 significantly reduces distortion and increases power handling at very low frequencies. Enclosures, ported and unported, can be used to extend low frequency response or reduce distortion at resonance.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. An electro-dynamic loudspeaker, comprising:
    a frame including a recessed portion;
    a plurality of vent holes in the recessed portion, the vent holes arranged in a plurality of columns, the vent holes in each column separated by a plurality of webs where a combined length of the vent holes in a longitudinal length of one of the plurality of columns and a combined length of the webs in a longitudinal length of the one of the plurality of columns defines a total length of the column of vent holes, where the combined length of the webs in a longitudinal length of the column is between about twenty and forty-five percent of the total length of the column of vent holes;
    a plurality of magnets disposed between the columns of vent holes;
    a diaphragm secured to the frame; and
    an electrical circuit disposed on a surface of the diaphragm.

2. The electro-dynamic loudspeaker according to claim 1, where the combined length of the webs in a longitudinal length of the column is greater than thirty percent of the length of the column of vent holes.

3. The electro-dynamic loudspeaker according to claim 1, where the combined length of the webs in a longitudinal length of the column is greater than forty percent of the length of the columns of vent holes.

4. The electro-dynamic loudspeaker according to claim 1, further comprising a porous material disposed over the vent holes.

5. The electro-dynamic loudspeaker according to claim 1, where the diaphragm is secured to the frame by an adhesive.

6. The electro-dynamic loudspeaker according to claim 1, further comprising at least one outer column of vent holes next to an edge of the recessed portion of the frame, the outer column of vent holes including webs separating the vent holes such that a combined length of the vent holes in a longitudinal length of the outer column and a combined length of the webs in a longitudinal length of the outer column defines a total length of the outer column of vent holes, where the combined length of the webs in a longitudinal length of the outer column is less than twenty percent of the total length of the outer column of vent holes.

7. The electro-dynamic loudspeaker according to claim 6, where the at least one outer column of vent holes includes a pair of outer columns of vent holes along opposite edges of the recessed portion of the frame.

8. A method of venting an electro-dynamic loudspeaker, comprising the steps of:
    providing a frame having a plurality of columns of vent holes, the vent holes in each column being separated by a plurality of webs where a combined length of the vent holes in a longitudinal length of one of the plurality of columns and a combined length of the webs in a longitudinal length of the column define a total length of the column of vent holes, where the combined length of the webs in a longitudinal length of the column is between about twenty and forty-five percent of the total length of the column of vent holes;
    mounting a plurality of columns of magnets adjacent to the columns of vent holes; and
    mounting a diaphragm to the frame, the diaphragm having a conductor disposed on a surface thereof including a plurality of linear sections.

9. The method according to claim 8, where the combined length of the webs in a longitudinal length of the columns is greater than thirty percent of the length of the columns of vent holes.

10. The method according to claim 8, where the combined length of the webs in a longitudinal length of the columns is greater than forty percent of the length of the columns of vent holes.

* * * * *